US008735493B2

(12) United States Patent
Stammer et al.

(10) Patent No.: US 8,735,493 B2
(45) Date of Patent: May 27, 2014

(54) PREPARATION OF ORGANOSILOXANE POLYMERS

(75) Inventors: Andreas Stammer, Pont-a-Celles (BE); Andreas Wolf, Huenstetten (DE)

(73) Assignee: Dow Corning Corporation, Midland, MI (US)

( * ) Notice: Subject to any disclaimer, the term of this patent is extended or adjusted under 35 U.S.C. 154(b) by 88 days.

(21) Appl. No.: 13/260,124

(22) PCT Filed: Mar. 18, 2010

(86) PCT No.: PCT/EP2010/053569
§ 371 (c)(1),
(2), (4) Date: Nov. 21, 2011

(87) PCT Pub. No.: WO2010/108854
PCT Pub. Date: Sep. 30, 2010

(65) Prior Publication Data
US 2012/0059115 A1    Mar. 8, 2012

(30) Foreign Application Priority Data

Mar. 26, 2009    (GB) ............................... GB0905205.1
Mar. 18, 2010    (WO) ................. PCT/EP2010/053569

(51) Int. Cl.
C08G 77/06    (2006.01)
C08G 77/08    (2006.01)

(52) U.S. Cl.
USPC .............................. 524/858; 524/860; 528/23

(58) Field of Classification Search
None
See application file for complete search history.

(56) References Cited

U.S. PATENT DOCUMENTS

| | | |
|---|---|---|
| 2,759,007 A | 8/1956 | Dunham, Jr. et al. |
| 2,759,008 A | 8/1956 | Dunham, Jr. et al. |
| 3,220,879 A | 11/1965 | Stare et al. |
| 3,308,203 A | 3/1967 | Metevia et al. |
| 3,341,486 A | 9/1967 | Murphy |
| 3,378,520 A | 4/1968 | Noll et al. |
| 3,419,593 A | 12/1968 | Willing |
| 3,427,270 A | 2/1969 | Northrup |
| 3,433,765 A | 3/1969 | Geipel |
| 3,480,583 A | 11/1969 | Bailey et al. |
| 3,715,334 A | 2/1973 | Karstedt |
| 3,814,730 A | 6/1974 | Karstedt |
| 3,817,894 A | 6/1974 | Butler et al. |
| 3,839,388 A | 10/1974 | Nitzsche et al. |
| 3,923,705 A | 12/1975 | Smith |
| 3,957,842 A | 5/1976 | Prokai et al. |
| 3,962,160 A | 6/1976 | Beers et al. |
| 3,971,751 A | 7/1976 | Isayama et al. |
| 4,020,044 A | 4/1977 | Crossan et al. |
| 4,022,941 A | 5/1977 | Prokai et al. |
| 4,071,498 A | 1/1978 | Frye et al. |
| 4,096,160 A * | 6/1978 | Ashby ........................... 556/459 |
| 4,147,855 A | 4/1979 | Schiller et al. |
| 4,240,450 A | 12/1980 | Grollier et al. |
| 4,247,445 A | 1/1981 | Smith, Jr. et al. |
| 4,250,290 A | 2/1981 | Petersen |
| 4,312,801 A | 1/1982 | Hiriart Bodin et al. |
| 4,357,438 A | 11/1982 | Sattlegger et al. |
| 4,358,558 A | 11/1982 | Shimizu |
| 4,433,096 A | 2/1984 | Bokerman et al. |
| 4,472,563 A | 9/1984 | Chandra et al. |
| 4,486,567 A | 12/1984 | Bowman et al. |
| 4,515,834 A | 5/1985 | Fukayama et al. |
| 4,564,693 A | 1/1986 | Riederer |
| 4,568,701 A | 2/1986 | Hopkins, Jr. |
| 4,568,707 A | 2/1986 | Voigt et al. |
| 4,599,438 A | 7/1986 | White et al. |
| 4,614,760 A | 9/1986 | Homan et al. |
| 4,624,676 A | 11/1986 | White et al. |
| 4,655,767 A | 4/1987 | Woodard et al. |
| 4,701,490 A | 10/1987 | Burkhardt et al. |
| 4,824,891 A | 4/1989 | Laurent et al. |
| 4,902,499 A | 2/1990 | Bolich, Jr. et al. |
| 4,902,575 A | 2/1990 | Yukimoto et al. |
| 4,906,707 A | 3/1990 | Yukimoto et al. |

(Continued)

FOREIGN PATENT DOCUMENTS

| | | |
|---|---|---|
| CN | 1346384 A | 4/2002 |
| DE | 2364856 | 12/1973 |

(Continued)

OTHER PUBLICATIONS

"Silicones: An Introduction to Their Chemistry and Applications" authored by Freeman and published by The Chapel River Press, Ltd. © 1962, pp. 26-27.*
Article published in the ACS Symposium Series "In Synthesis and Properties of Silicone and Silicone Modified Materials" by the American Chemical Society from Washington DC 2003 entitled "Polysiloxanes in Compressed Carbon Dioxide" authored by Folk et al.*
English language translation for JP 2003-252996 extracted from PAJ database on Jun. 13, 2011, 13 pages.

(Continued)

Primary Examiner — Marc Zimmer
(74) Attorney, Agent, or Firm — Howard & Howard Attorneys PLLC

(57) ABSTRACT

A method of making a polysiloxane containing polymer is described. The method comprises the steps of the polycondensation of a) 100 parts by weight of oligomers comprising non-cyclic siloxane containing oligomers having at least two condensable groups per molecule alone or in a mixture with one or organic oligomers having at least two condensable groups per molecule in the presence of: b) at least 2 parts by weight per 100 parts of (a) of one or more condensation catalysts comprising a Bronsted acid or a Lewis acid c) at least 15 parts by weight per 100 parts of (a) of one or more liquefied gases or a supercritical fluid therefrom. Subsequent to the reaction completion the polysiloxane containing polymer is recovered by expansion of the liquefied gas(es) or supercritical fluid (c).

12 Claims, No Drawings

(56) References Cited

U.S. PATENT DOCUMENTS

| | | | |
|---|---|---|---|
| 4,918,121 A | 4/1990 | Peccoux et al. |
| 4,926,673 A | 5/1990 | Laurent et al. |
| 4,965,311 A | 10/1990 | Hirose et al. |
| 4,968,766 A | 11/1990 | Kendziorski |
| 4,985,476 A | 1/1991 | Endres et al. |
| 4,990,555 A | 2/1991 | Trego |
| 5,000,029 A | 3/1991 | Laurent et al. |
| 5,043,012 A | 8/1991 | Shinohara et al. |
| 5,063,270 A | 11/1991 | Yukimoto et al. |
| 5,070,175 A | 12/1991 | Tsumura et al. |
| 5,175,325 A | 12/1992 | Brown et al. |
| 5,210,129 A | 5/1993 | de la Croi Habimana et al. |
| 5,286,787 A | 2/1994 | Podola et al. |
| 5,300,612 A | 4/1994 | Saruyama |
| 5,350,824 A | 9/1994 | Kobayashi |
| 5,436,061 A | 7/1995 | Hanneman et al. |
| 5,534,588 A | 7/1996 | Knepper et al. |
| 5,569,750 A | 10/1996 | Knepper et al. |
| 5,863,976 A | 1/1999 | Schneider |
| 5,914,382 A | 6/1999 | Friebe et al. |
| 5,919,883 A * | 7/1999 | Dittrich et al. ............. 528/15 |
| 5,973,060 A | 10/1999 | Ozaki et al. |
| 5,981,680 A | 11/1999 | Petroff et al. |
| 6,451,440 B2 | 9/2002 | Atwood et al. |
| 6,545,104 B1 | 4/2003 | Mueller et al. |
| 6,599,633 B1 | 7/2003 | Wolf et al. |
| 6,664,323 B2 | 12/2003 | Lucas |
| 6,833,407 B1 | 12/2004 | Ahmed et al. |
| 7,056,869 B2 | 6/2006 | Guyomar et al. |
| 7,205,050 B2 | 4/2007 | Haas |
| 7,605,203 B2 | 10/2009 | Feng et al. |
| 7,754,800 B2 | 7/2010 | Maton et al. |
| 8,022,162 B2 | 9/2011 | Maton et al. |
| 8,067,519 B2 | 11/2011 | Maton et al. |
| 8,076,411 B2 | 12/2011 | Maton et al. |
| 8,084,535 B2 | 12/2011 | Maton et al. |
| 8,088,857 B2 | 1/2012 | Maton et al. |
| 8,153,724 B2 | 4/2012 | Maton et al. |
| 2002/0005344 A1 | 1/2002 | Heidlas et al. |
| 2003/0059393 A1* | 3/2003 | Wrolson et al. ........... 424/70.12 |
| 2003/0105260 A1 | 6/2003 | Cook et al. |
| 2003/0195370 A1 | 10/2003 | Taylor et al. |
| 2004/0122199 A1 | 6/2004 | Scheim et al. |
| 2005/0020754 A1 | 1/2005 | Haas |
| 2005/0054765 A1 | 3/2005 | Putzer |
| 2008/0312365 A1 | 12/2008 | Maton et al. |
| 2008/0312366 A1 | 12/2008 | Maton et al. |
| 2008/0312367 A1 | 12/2008 | Maton et al. |
| 2009/0050852 A1 | 2/2009 | Kanamori et al. |
| 2009/0215944 A1 | 8/2009 | Maton et al. |
| 2009/0234052 A1 | 9/2009 | Maton et al. |
| 2012/0016063 A1 | 1/2012 | Maton et al. |

FOREIGN PATENT DOCUMENTS

| | | |
|---|---|---|
| DE | 2802170 | 1/1978 |
| DE | 2653499 | 5/1978 |
| DE | 3217516 A1 | 11/1983 |
| DE | 3342027 C1 | 5/1985 |
| DE | 3342026 A1 | 7/1985 |
| DE | 19654488 A1 | 7/1998 |
| EP | 0043501 A1 | 1/1982 |
| EP | 0093918 A1 | 11/1983 |
| EP | 0154922 | 5/1985 |
| EP | 0196565 A1 | 10/1986 |
| EP | 0215470 A1 | 3/1987 |
| EP | 0221824 A1 | 5/1987 |
| EP | 0277740 A2 | 8/1988 |
| EP | 0315333 A2 | 5/1989 |
| EP | 0378420 A2 | 7/1990 |
| EP | 0382365 A2 | 8/1990 |
| EP | 0397036 A2 | 11/1990 |
| EP | 0435328 A2 | 7/1991 |
| EP | 0522776 A1 | 1/1993 |
| EP | 0537785 A1 | 4/1993 |
| EP | 0651022 A2 | 5/1995 |
| EP | 0679674 A2 | 11/1995 |
| EP | 0801101 A1 | 10/1997 |
| EP | 0802233 A2 | 10/1997 |
| EP | 0807667 A2 | 11/1997 |
| EP | 0842974 A1 | 5/1998 |
| EP | 0860459 A2 | 8/1998 |
| EP | 0860461 A2 | 8/1998 |
| EP | 0885921 A2 | 12/1998 |
| EP | 0909778 A1 | 4/1999 |
| EP | 0982346 A1 | 3/2000 |
| EP | 1008598 A2 | 6/2000 |
| EP | 1041119 A2 | 10/2000 |
| EP | 1138715 A1 | 10/2001 |
| EP | 1179567 | 2/2002 |
| EP | 1252252 | 10/2002 |
| EP | 1368426 | 12/2003 |
| EP | 1254192 B1 | 8/2004 |
| EP | 1481038 | 12/2004 |
| EP | 1905795 A1 | 4/2008 |
| GB | 756613 | 9/1956 |
| GB | 756614 | 9/1956 |
| GB | 760433 | 10/1956 |
| GB | 895091 | 5/1962 |
| GB | 918823 | 2/1963 |
| GB | 1289526 | 9/1972 |
| GB | 1490240 | 10/1977 |
| GB | 2012789 A | 8/1979 |
| GB | 2041955 A | 9/1980 |
| GB | 2107726 A | 5/1983 |
| GB | 2252975 A | 8/1992 |
| GB | 2424898 A | 10/2006 |
| JP | S35-17696 B | 12/1960 |
| JP | 59100136 | 6/1984 |
| JP | 59176326 | 10/1984 |
| JP | 62253629 | 11/1987 |
| JP | 63-083167 | 4/1988 |
| JP | 01-152131 | 6/1989 |
| JP | 01-152156 | 6/1989 |
| JP | H04-33926 A | 2/1992 |
| JP | 05-178996 | 7/1993 |
| JP | 06-016813 | 1/1994 |
| JP | H07-138375 A | 5/1995 |
| JP | 9506667 | 6/1997 |
| JP | 2000-026726 | 1/2000 |
| JP | 2000-103857 | 11/2000 |
| JP | 2000-191912 | 11/2000 |
| JP | 2003-252996 * | 9/2003 |
| WO | WO 9532245 | 11/1995 |
| WO | WO 99/06473 A1 | 2/1999 |
| WO | WO 99/65979 A1 | 12/1999 |
| WO | WO 99/66012 A2 | 12/1999 |
| WO | WO 00/27910 A1 | 5/2000 |
| WO | WO 00/61672 A1 | 10/2000 |
| WO | WO 01/49774 A2 | 7/2001 |
| WO | WO 01/53425 A2 | 7/2001 |
| WO | WO 01/79330 A1 | 10/2001 |
| WO | WO 02/062893 A2 | 8/2002 |
| WO | WO 03/006530 A1 | 1/2003 |
| WO | WO 03/074634 A2 | 9/2003 |
| WO | WO 03/080713 A1 | 10/2003 |
| WO | WO 2005/019308 A1 | 3/2005 |
| WO | WO 2005/103117 A1 | 11/2005 |
| WO | WO 2006/106362 A1 | 10/2006 |
| WO | WO 2007/119517 A1 | 10/2007 |
| WO | WO 2008/045427 A1 | 4/2008 |
| WO | WO 2010/108853 A1 | 9/2010 |

OTHER PUBLICATIONS

English language translation for JP 2000-026726 extracted from PAJ database on Jun. 13, 2011, 27 pages.
English language abstract for JP 63-083167 extracted from PAJ database on Jun. 13, 2011, 6 pages.
English language translation for JP 2000-103857 extracted from PAJ database on Jun. 13, 2011, 22 pages.
English language abstract for JP 01-152156 extracted from PAJ database on Jun. 13, 2011, 14 pages.

(56) References Cited

OTHER PUBLICATIONS

English language translation for JP 05-178996 extracted from PAJ database on Jun. 13, 2011, 17 pages.
English language abstract for JP 9506667 extracted from espacenet.com database on Jun. 13, 2011, 31 pages.
English language abstract for JP 01-152131 extracted from PAJ database on Jun. 13, 2011, 7 pages.
English language translation for JP 06-016813 extracted from PAJ database on Jun. 13, 2011, 13 pages.
PCT International Search Report for PCT/EP2010/053569, dated May 21, 2010, 4 pages.
English language abstract for DE 19654488 extracted from the espacenet.com database on Mar. 14, 2012, 7 pages.
PCT International Search Report for PCT/EP2010/053567, dated Jun. 2, 2010, 3 pages.
English language abstract for EP 0221824 extracted from the espacenet.com database on Mar. 14, 2012, 17 pages.
English language abstract not available for JP 59176326; however, see English language equivalent US 4,433,096. Original document extracted from the espacenet.com database on Mar. 19, 2012, 13 pages.
Chenghong Li: "Preparation of Nitrile Containing Siloxane Triblock Copolymers and their Application as Stabilizers for Siloxane Magnetic Fluids (Thesis)" 1996, pp. 22-27.
Mingotaud et al., "Cationic and anionic ring-opening polymerization in supercritical CO2", Macromol. Symp. 153, 77-86 (2000).
Mingotaud et al., "Cationic and Anionic Ring-Opening Polymerization in Supercritical CO2, Preliminary Results", Polymer Journal, vol. 31, No. 5, pp. 406-410 (1999).
English language abstract for CN 1346384 extracted from espacenet.com database, dated Jul. 16, 2010, 22 pages.
English language abstract for DE 3217516 extracted from espacenet.com database dated Jul. 15, 2008.
English language abstract for DE 3342026 extracted from espacenet.com database dated Jul. 15, 2008.
English language abstract for DE 3342027 extracted from espacenet.com database dated Jul. 15, 2008.
English language abstract for EP 0043501 extracted from delphion.com database dated Jul. 22, 2008.
English language abstract for EP 0093918 extracted from espacenet.com database dated Jul. 18, 2008.
English language abstract for EP 0215470 extracted from delphion.com database dated Jul. 22, 2008.
English language abstract for EP 0801101 extracted from espacenet.com database dated Jul. 15, 2008.
English language abstract for EP 0807667 extracted from espacenet.com database dated Jul. 15, 2008.
English language abstract for EP 0885921 extracted from espacenet.com database dated Jul. 18, 2008.
Article: KIRK-OTHMER, "Silicone Compounds", Encyclopedia of Chemical Technology, 4th edition, vol. #22, 1997, pp. 107-109.
PCT International Search Report for PCT/GB2006/050075, dated Jul. 28, 2006, 4 pages.
PCT International Search Report for PCT/GB2006/050074, dated Aug. 2, 2006, 4 pages.
PCT International Search Report for PCT/GB2006/050072, dated Jul. 21, 2006, 4 pages.
PCT International Search Report for PCT/GB2006/050073, dated Aug. 2, 2006, 5 pages.
PCT International Search Report for PCT/EP2006/061285, dated Jul. 28, 2006, 4 pages.
PCT International Search Report for PCT/US2006/011986, dated Aug. 2, 2006, 3 pages.
English language translation for JP 2000-191912 extracted from IPDL database on Nov. 3, 2011, 156 pages.
Dictionary of Chemistry and Chemical Technology, 2 pages (title page and p. 1250); Author: Hua xue hua gong da ci dian bian wei hui.; Hua xue gong ye chu ban she. Ci shu bian ji bu Publisher: Hua xue gong ye chu ban she, 2003 ISBN: 7502526110 9787502526115.
Aart Molenberg et al., A Fast Catalyst System for The Ring-Opening Polymerization of Cyclosiloxanes, Macromol, Rapid Commun. 16, 449-453 (1995), 5 pages.
Reinhard Schwesinger, Extremely Strong, Uncharged Auxiliary Bases; Monomeric and Polymer-Supported Polyaminophosphazenes (P2-P5), 1996, 27 pages.
A.W. Karlin et al., Uber Syntheseverfahren von Siloxanelastomeren, 5 pages.
Mark E. Van Dyke, et al., Reaction Kinetics for the Anionic Ring-Opening Polymerization of Tetraphenyletramethylcyclo-Tetrasiloxane Using a Fast Catalyst System, 2 pages.
English language abstract not available for JP 62253629; however, see English language equivalent US 4824891. Original document extracted from the espacenet.com database on Mar. 19, 2012, 15 pages.
English language abstract for JP H04-33926 extracted from the espacenet.com database on Dec. 18, 2013, 8 pages.
English language abstract and machine-assisted English translation for JP H07-138375 extracted from the PAJ database on Dec. 18, 2013, 43 pages.
English language abstract not available for JP S35-17696; however, see English language equivalent GB 760,433, 7 pages.
English language abstract for WO 2007/119517 extracted from the espacenet.com database on Dec. 18, 2013, 48 pages.

\* cited by examiner

PREPARATION OF ORGANOSILOXANE POLYMERS

RELATED APPLICATIONS

This application claims priority to and all the advantages of International Patent Application No. PCT/EP2010/053569, filed on Mar. 18, 2010, which claims priority to Great Britain Patent Application No. GB 0905205.1, filed on Mar. 26, 2009.

This invention is concerned with the preparation of siloxane containing polymers via the condensation polymerisation of linear organosiloxane oligomers in the presence of removable diluents.

It is well known that linear and branched siloxane oligomers or short chain polymers having 2 or more hydroxyl and/or other hydrolysable groups per molecule may be polymerised via a polycondensation reaction pathway to high molecular weight, long chain polymers by polymerisation in the presence of with a suitable condensation catalyst and, where deemed necessary, heat.

The rheological properties of resulting uncured polymers are primarily a function of their viscosities. In general the lower the viscosity of a polymer the higher the extrusion rate of uncured compositions which contain the polymer. The viscosity of an uncured polymer is directly related to the molecular weight of the polymer and the length of the polymer chain, usually defined as the degree of polymerisation (dp). The viscosity of the uncured polymer is also a major influence on several of the physical properties of compositions incorporating the polymer, when such compositions are subsequently cured. The viscosity of polymers resulting from the polycondensation reactions discussed above may have viscosities from a few thousand mPa·s at 25° C. (relatively short chain polymers in liquid form) to a viscosity of many millions of mPa·s at 25° C. (long chain polymers in the form of gums). Longer chain polymers can provide compositions containing the polymer with advantageous physical characteristics, however, the more viscous the end product, (i.e. the longer the polymer chain lengths) the more difficult it is to handle and utilise the polymer when making compositions containing it.

A new process for the polycondensation of siloxane oligomers and/or short chain polymers is described in WO2006/106362 in which additionally an extender (sometimes referred to as processing aid) and/or a plasticiser, typically used in compositions containing the polymer end-product, such as silicone based sealants, is present during polymerisation. Generally the extender and/or plasticiser is unreactive with the reactants, intermediates and the reaction product(s). This innovative method may result in the preparation of exceptionally long chain polymers whilst avoiding processing problems when subsequently used in compositions. The presence of the plasticiser and/or extender maintains the diluted polymer at a manageable viscosity, whilst the polymer itself would, in the absence of the plasticiser and/or extender, have a viscosity of many millions of mPa·s at 25° C.

This process is excellent for applications which regularly require to have liquids in the form of plasticisers and/or extenders present in compositions. The commonest application being their use in silicone based sealants. However, the process essentially retains substantially all the plasticiser and/or extender in the polymer mixture which clearly renders the product unsuitable for many applications requiring undiluted polymer products.

EP0221824 describes a process for the acid or base catalysed polymerisation of cyclic polydiorganosiloxane oligomers or mixtures of cyclic and linear polydiorganosiloxane oligomers with the polymerisation process taking place in at least one fluid under superatmospheric pressure. The physical state of the fluid during polymerisation is chosen from:
(i) A gas under supraatmospheric pressure
(ii) a liquid state; or
(iii) a supercritical state
and the resulting polymer is recovered by "expansion" i.e. removal of the fluid by allowing it to change into its normal gaseous state. This results in a substantially undiluted polymer which at high viscosities will be in viscosity of many millions of mPa·s at 25° C. However, the experimental data provided shows that a small but significant amount of low molecular weight volatile siloxanes (>2% by weight) remain in the polymer subsequent to preparation and hence a pure polymer is not obtained. It is further to be appreciated that from the relatively high levels of residual volatile siloxanes located it is apparent that when discharged from the reaction vessel after polymerisation the fluid does not extract the volatile siloxanes out of the polymer. Whilst examples 20 and 21 of EP0221824 disclose the use of dihydroxypolydimethylsiloxane, it is to be appreciated that this polymer is used as an end blocker which redistributes the OH groups thereon via an equilibration process and water is not removed from the reaction. Hence polycondensation is not taking place in these examples.

Mingotaud, A.-F., Cansell, F., Gilbert, N., and Soum, A., "Cationic and Anionic Ring-Opening Polymerization in Supercritical $CO_2$—Preliminary Results", Polymer Journal, Vol. 31, No. 5, pp. 406-410 (1999) and Mingotaud, A.-F., Dargelas, F., and Cansell, F., "Cationic and Anionic Ring-Opening Polymerization in Supercritical $CO_2$", Macromol. Symp. Vol. 153, 77-86 (2000) describe the ring-opening polymerization of D4 in supercritical $CO_2$ in the presence of cationic initiators (catalysts), specifically triflic acid (trifluoromethanesulfonic acid). The pressure range considered in the experiments is 100 to 200 bars, temperature range is 110 to 140° C.

A method for the extraction of volatile silicone materials from pre-prepared viscous silicone based polymers using compressed gases is discussed in US2002/0005344. WO 03/080713 describes the supercritical fluid extraction of vitreoretinal silicone tamponades, involving the purification of a silicone oil or fluid using neat supercritical carbon dioxide or a supercritical carbon dioxide mixture to remove relatively low molecular weight cyclic siloxanes and oligomers from the silicone oil.

The use of supercritical fluids is also known in the prior art as a means of purifying pre-cured siloxane based elastomeric materials. For example U.S. Pat. No. 5,436,061 describes a method of reducing the volatile fraction content of a cured pressure sensitive adhesive (PSA) by extracting the cured PSA with a fluid at or near its supercritical state. EP 0435328 describes a method of removal of siloxane oligomers present in organopolysiloxane moldings using supercritical carbon dioxide gas whilst avoiding cracking of the moldings by regulating the pressure reduction.

The inventors have therefore now identified a process for the polycondensation of siloxane containing oligomers in which the polymers are prepared in the presence of a diluent but the diluent is removed subsequent to polymerisation which process has the added advantage of providing a polymer product containing very low amounts of cyclic volatile siloxane impurities due to the specific reaction conditions identified rather than by extraction of the volatile content of the polymer.

In accordance with the present invention there is provided a method of making a polysiloxane containing polymer comprising the steps of:
polycondensation of
a) 100 parts by weight of oligomers comprising non-cyclic siloxane containing oligomers having at least two condensable groups per molecule alone or in a mixture with one or organic oligomers having at least two condensable groups per molecule in the presence of:
b) at least 2 parts by weight per 100 parts of (a) of one or more condensation catalysts comprising a Bronsted acid or a Lewis acid
c) at least 15 parts by weight per 100 parts of (a) of one or more liquefied gases or a supercritical fluid therefrom; and subsequently recovering the polysiloxane containing polymer by expansion of the liquefied gas(es) or supercritical fluid (c).

The concept of "comprising" where used herein is used in its widest sense to mean and to encompass the notions of "include" and "consist of". Unless otherwise indicated all viscosity values given are at a temperature of 25° C. Preferably the method relates to a "pure" polycondensation system where the only reaction taking place or substantially the only reaction taking place is polycondensation.

A polysiloxane containing polymer is intended to mean a polymer comprising multiple polysiloxane groups per molecule and is intended to include a polymer substantially containing solely polysiloxane groups in the polymer chain or polymers where the backbone contains both polysiloxane groups and organic polymeric groups in the polymer chain.

Polycondensation is the polymerisation of multiple monomers and/or oligomers with the elimination of low molecular weight by-product(s) such as water, ammonia or alcohols containing between 1 and 6 carbon atoms (typically methanol and ethanol). Polycondensation type polymerisation reactions are most generally linked to the interaction of compounds having condensable end groups which can interact with the release of e.g. water or methanol or the like. Preferably the condensable end groups on the oligomers used in the process of the present invention are hydroxyl end groups or hydrolysable end groups (e.g. alkoxy groups). The inventors have found that the condensation polymerisation process in accordance with the present invention may utilise any known suitable oligomer(s) (a) with one or more of the above mentioned condensation catalysts (b) in the amounts specified.

Hence, one preferred method for the polymerisation process in accordance with the present invention is the polymerisation of non-cyclic (i.e. straight chain and/or branched) siloxane containing oligomers comprising multiple units of formula (1).

$$R'_a SiO_{4-a/2} \tag{1}$$

wherein each R' may be the same or different and denotes hydrogen, a hydrocarbon group having from 1 to 18 carbon atoms, a substituted hydrocarbon group having from 1 to 18 carbon atoms or a hydrocarbonoxy group having up to 18 carbon atoms and a has, on average, a value of from 1 to 3, preferably 1.8 to 2.2. Preferably, the siloxane containing oligomers have a viscosity of between 10 mPa·s and 50000 mPa·s at 25° C.

For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as aminofunctional groups, amido-functional groups, and cyano-functional groups; sulphur atoms; and sulphur atom containing groups such as mercapto groups.

Particularly preferred examples of groups R' include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Preferably, at least some and more preferably substantially all of the groups R' are methyl. Some R' groups may be hydrogen groups. Preferably the siloxane containing oligomers are linear or branched polydialkylsiloxanes, most preferably linear or branched polydimethylsiloxanes. Most preferably the siloxane containing oligomers are linear polydimethylsiloxanes.

The siloxane containing oligomers are preferably substantially linear materials, which are end-blocked with a siloxane unit of the formula $R''_3SiO_{1/2}$, wherein each R" is the same or different and is R' or a condensable group. Any suitable combination of condensable end groups may be used for the polymerisation process of the present invention (i.e. the condensable groups chosen must be able to undergo a condensation reaction together in order to polymerise). Preferably at least one R" group is a hydroxyl or hydrolysable group. Typically the condensable groups used as monomer/oligomer end-groups are as indicated above but may be any groups which will participate in a polycondensation of the monomer/oligomer in the presence of the liquefied gas(es) in accordance with the present invention. A small amount (<20%) of groups $R''_3SiO_{1/2}$, may comprise non-hydrolysable end-groups such as trialkylsilyl groups.

It will also be appreciated that, where required, a mixture of siloxane containing oligomers having appropriate condensable end groups so as to be polymerisable with each other may be used to form random copolymers or ABA or $AB_n$ type block copolymers. Such siloxane containing oligomers the polymeric chain may comprise blocks made from chains of units depicted in (1) above such that when there are 2 R' groups present (i.e. a=2 as with most units of the polymer), the R' groups are:

both alkyl groups (preferably both methyl or ethyl), or
alkyl and phenyl groups, or
alkyl and fluoropropyl, or
alkyl and vinyl or
alkyl and hydrogen groups.

Typically at least one block will comprise siloxane units in which both R' groups are alkyl groups.

It will also be appreciated that, where required, organic monomers and/or oligomers having appropriate condensable end groups so as to be polymerisable with said organopolysiloxane monomers and/or oligomers may be introduced in order to form random copolymers or ABA or $AB_n$ type block copolymers. Preferably the organic monomers and/or oligomers comprise two or more condensable groups which are condensable with the condensable groups of the siloxane monomers and/or oligomers. Examples of organic monomers which may be used in accordance with the present invention include, for example polystyrene and/or substituted polystyrenes such as poly(α-methylstyrene), poly(vinylmethylstyrene), poly(p-trimethylsilylstyrene) and poly(p-trimethylsilyl-α-methylstyrene). Other organic components may include acetylene terminated oligophenylenes, vinylbenzyl terminated aromatic polysulphones oligomers, aromatic polyesters and aromatic polyester based monomers.

However, the most preferred organic based polymeric blocks in A are polyoxyalkylene based blocks. Such polyoxyalkylene compounds preferably comprise a linear predominantly oxyalkylene polymer comprised of recurring oxyalkylene units, (—$C_nH_{2n}$—O—) illustrated by the average formula (—$C_nH_{2n}$—O—)$_y$ wherein n is an integer from 2 to 4 inclusive and y is an integer of at least four. At least some of the hydrogen units may be substituted with alternative substituents. The average molecular weight of each polyoxyalkylene polymer block may range from about 300 to about 10,000. Moreover, the oxyalkylene units are not necessarily identical throughout the polyoxyalkylene monomer, but can differ from unit to unit. A polyoxyalkylene block, for example, can be comprised of oxyethylene units, (—$C_2H_4$—O—); oxypropylene units (—$C_3H_6$—O—); or oxybutylene units, (—$C_4H_8$—O—); or mixtures thereof. In one embodiment of the present invention the oxyalkylene polymer may preferably comprise perhalooxyalkylene groups, most preferably perfluoroxyalkylene groups.

Other polyoxyalkylene monomers and/or oligomers may include for example: units of the structure—

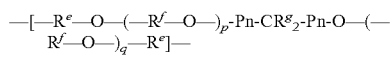

in which Pn is a 1,4-phenylene group, each $R^e$ is the same or different and is a divalent hydrocarbon group having 2 to 8 carbon atoms, each $R^f$ is the same or different and, is, an ethylene group or propylene group, each $R^g$ is the same or different and is a hydrogen atom or methyl group and each of the subscripts p and q is a positive integer in the range from 3 to 30.

In accordance with the present invention the condensation catalyst used is a Bronsted acid or a Lewis acid in an amount of at least 2 parts by weight per 100 parts of (a) of one or more condensation catalysts The amount of catalyst used will vary dependent on the catalyst utilised but typically the catalyst used will be present in an amount up to a maximum of about 5 parts by weight per 100 parts of (a). The Catalyst may alternatively be a mixture of such acids. Any suitable Bronsted acid or Lewis acid may be utilised. Lewis acid catalysts, (a "Lewis acid" is any substance that will take up an electron pair to form a covalent bond). suitable for the polymerisation in the present invention include, for example, boron trifluoride $FeCl_3$, $AlCl_3$, $ZnCl_2$, $ZnBr_2$, $B(C_6F_5)_3$ and catalysts of formula $M^1R^{21}{}_qX^2{}_f$ where $M^1$ is B, Al, Ga, In or Tl each $R^{21}$ is independently the same (identical) or different and represents a monovalent aromatic hydrocarbon radical having from 6 to 14 carbon atoms, such monovalent aromatic hydrocarbon radicals preferably having at least one electron-withdrawing element or group such as —$CF_3$, —$NO_2$ or —CN, or substituted with at least two halogen atoms; $X^2$ is a halogen atom selected from the group consisting of F, Cl, Br, and I; q is 1, 2, or 3; and f is 0, 1 or 2; with the proviso that q+f=3. Lewis acid derivates of phosphonitrile halides and reaction products of phosphonitrile chloride and phosphate ester may also be used.

Suitable Bronsted acids (i.e. a substance which acts as a proton donor, or a precursor thereof), include sulphuric acid, phosphoric acid, alkylsulphuric acid (e.g. ethyl sulphuric acid), pyrophosphoric acid, nitric acid, boric acid, activated Fullers earth, organic acids such as citric acid, stearic acid, acetic acid, sulphonic acid, halosulphonic acids such as chlorosulphonic acid and alkanoic acids such as dodecanoic acid, or a precursor of any of the compounds mentioned, phosphorus halides ($POCl_3$ and $PCl_5$) and chlorophosphazenes.

Still more preferably, the Brönsted acid is an organic sulphonic acid comprising 10 C-atoms or more, more preferably 12 C-atoms or more, and most preferably 14 C-atoms or more, the sulphonic acid further comprising at least one aromatic group which may e.g. be a benzene, naphthalene, phenanthrene or anthracene group. In the organic sulphonic acid, one, two or more sulphonic acid groups may be present, and the sulphonic acid group(s) may either be attached to a non-aromatic, or preferably to an aromatic group, of the organic sulphonic acid.

Particularly preferred are those of the formula $R^{20}(SO_3H)_z$ in which $R^{20}$ represents an alkyl group preferably having from 6 to 18 carbon atoms such as for example a hexyl or dodecyl group, an aryl group such as a phenyl group or an alkaryl group such as dinonyl- or didoecyl-naphthyl. When $R^{20}$ is an alkyl group z=1 but when $R^{20}$ contains an aryl group then z may have a value of from 1 to 4. Preferably the compound used as an organic aromatic sulphonic acid silanol condensation catalyst has from 10 to 200 C-atoms, more preferably from 14 to 100 C-atoms. Preferably $R^{20}$ is an alkaryl group having an alkyl group having from 4 to 30 and more preferably 6 to 18 carbon atoms.

When the catalyst is an organic aromatic sulphonic acid it may comprise the structural unit $R^{20}(SO_3H)_z$ one or several times, e.g. two or three times. For example, two $R^{20}(SO_3H)_z$ structural units may be linked to each other via a bridging group such as an alkylene group.

Most preferred are alkylphenyl sulphonic acids such as, for example, dodecylbenzenesulphonic acid (DBSA). Whilst this group of catalysts are excellent condensation catalysts the prior art teaches that they are not condensation specific. In particular, DBSA is also known to be a surface-active equilibration catalyst (see for example U.S. Pat. No. 4,654,041). Equilibration catalysts are able to catalyse both the scission and formation of siloxane bonds and as such cause the formation of short chain cyclic siloxanes as well as catalyzing the condensation polymerisation reaction taking place.

This dual catalytic activity of DBSA means that the end product of the reaction process in accordance with the present invention would be expected by the man skilled in the art to be determined by the relative speed of the polycondensation reaction versus the equilibration reaction. In many commercial condensation polymerisation processes the reaction by-product, e.g. water, is removed by utilization of a chemical or physical water scavenger (which needs to be chosen not to interfere with the polycondensation reaction) by adsorbing or quenching the catalyst. Alternatively the reaction by-product is removed by the application of a vacuum. This of course is not possible during the process of the present invention because of the necessity to keep the gas(es) liquefied in the reaction mixture unless the reaction is carried out at a temperature of below 0° C. in which case the water can be "frozen out" of the mixture.

It is therefore very surprising to note that less than 0.5% by weight of the final product are volatile cyclic siloxane impurities (e.g. octamethylcyclotetrasiloxane (henceforth referred to as "$D_4$"), decamethylcyclopentasiloxane (henceforth referred to as "$D_5$") and dodecamethylcyclohexasiloxane henceforth referred to as "$D_6$"). These values are based on measurements using GC-FID (flame ionisation detection). This is particularly unexpected because in the present process no significant effort is made to remove the condensation reaction by-product (i.e. water) the man skilled in the art would expect the equilibration reaction to dominate increasingly as time goes by because of the ever increasing presence of the by-product, e.g. water, in the reaction product having a negative effect on the polycondensation reaction rate. Hence, the remarkably low levels of cyclic impurities, such as $D_4$, $D_5$ and $D_6$, prepared during the process in accordance with the present invention is completely contrary to the expectation of the man skilled in the art.

The activity of the catalyst is preferably quenched by using a neutralizing agent which reacts with the catalyst to render it non-active. Typically in the case of the acid type condensation catalysts, required in the present invention, the neutralising agent is a suitable base, for example, an amine such as a mono/di and trialkanolamine, specific examples include but are not limited to monoethanolamine (MEA) and triethanolamine (TEA). In the case of systems using a DBSA catalyst alternative quenching means include aluminasilicate zeolite materials that were found to absorb DBSA and leave a stable polymer. In most cases catalyst residues remain in the polymer product or where appropriate may be removed by filtration or alternative methods. Preferably about 2.5 parts by weight per 100 parts of (a) of one or more condensation catalysts is used in accordance with the present invention.

Optionally an end-blocking agent may be used to regulate the molecular weight of the polymer and/or add functionality. End-blocking agents are a means of controlling the reactivity/polymer chain length of the polymer by introducing compounds which will react with only one hydrolysable end group, subsequently preventing further polycondensation. It is also a means of introducing alternative end groups on the polymer, e.g. silicon bonded hydrogen groups, alkenyl groups which may then be utilised to produce alternative reactive end groups or provide a non-reactive end group. In the case where the end-blocking process aims to replace a silanol end-group with a triorganosiloxy group to prevent further polymerisation, this may be achieved by incorporating a triorganoalkoxy silane or a triorganosilanol in to the monomers and/or oligomers. Examples of such silanes are trimethyl methoxysilane, methyl phenyl dimethoxysilane, methyl phenyl vinyl ethoxysilane and aminopropyl trimethoxy silane. In the case where alkenyl end groups are required suitable end-blockers include, for example alkenyl silazanes. Hydrolysable groups which may be introduced using end-blocking agents include alkoxy groups and acetoxy groups and
—$Si(OH)_3$, —$(R^a)Si(OH)_2$, —$(R^a)_2SiOH$, —$R^aSi(OR^b)_2$, —$Si(OR^b)_3$, —$R^a_2SiOR^b$ or —$R^a_2Si$—$R^c$—$SiR^d_p(OR^b)_{3-p}$ where each $R^a$ independently represents a monovalent hydrocarbyl group, for example, an alkyl group, in particular having from 1 to 8 carbon atoms, (and is preferably methyl); each $R^b$ and $R^d$ group is independently an alkyl or alkoxy group in which the alkyl groups suitably have up to 6 carbon atoms; $R^c$ is a divalent hydrocarbon group which may be interrupted by one or more siloxane spacers having up to six silicon atoms; and p has the value 0, 1 or 2. Water and other polycondensation by-products may also act as endblockers.

For the sake of clarification it is to be understood that a fluid has a liquid phase and a vapour phase and is termed supercritical when its temperature exceeds the critical temperature (Tc). At this point the two fluid phases become indistinguishable. The term "supercritical state" includes those conditions of temperature and pressure under which certain solvent mediums are known to form a supercritical fluid.

The term "supercritical or near supercritical conditions" also includes conditions of temperature, pressure under which certain solvent mediums are often referred to as compressed mediums. This includes compressed mediums such as compressed ethane, compressed propane, and especially compressed $CO_2$. In general many of the reactions take place in solvent mediums or mixtures of solvent mediums which are chosen for their ability to form supercritical or near supercritical fluids. Additionally, certain solvent mediums may cause the microcapsule polymer to swell and this may aid the contact of the reactants with the catalyst. Any solvent medium which is capable of forming a supercritical or near supercritical fluid can be employed. Solvent mediums capable of forming a supercritical or near supercritical fluid include low molecular weight hydrocar-dimethyl ether, carbon dioxide, ammonia, water, nitrous oxide and mixtures thereof. Preferred solvent mediums include low molecular weight hydrocarbons, particularly Most preferred solvent medium is carbon dioxide. Examples of solvent mediums include ethane, propane, butane, $CO_2$, dimethyl ether, $N_2O$, water, and ammonia. It is preferred that the solvent medium is chosen such that both the substrate and products of the reaction form a substantially homogenous mixture with the solvent medium and that this homogenous mixture is in a supercritical or near supercritical state.

For the sake of the present invention a liquefied gas is a gaseous substance converted into a liquid. There are several methods for achieving the liquefaction of gases but typically in the case of the present invention liquefaction is achieved by vapour compression when the substance is below its critical temperature. However, any other suitable method may be utilised. Hence, the liquefied gas(es) used in accordance with the present invention may be sub-critical (i.e. below the critical point) or at their critical point.

Any suitable fluid may be utilised in the present invention. Preferred examples include fluids which are gases at room temperature and atmospheric pressure e.g. but are not restricted to one or more of carbon dioxide, helium, argon, xenon, nitrogen, nitrogen oxides, e.g. nitrous oxide, alkylhalides such as monofluoromethane, chlorotrifluoromethane, and/or hydrocarbon gases such as methane, ethane, propane ethane and butane. Of the above Carbon dioxide and the hydrocarbon gases are particularly preferred. The fluid may also comprise fluids which are volatile liquids at room temperature and pressure but gases at moderately elevated temperatures such as, for example, carbon tetrachloride, chloroform, methylenechloride, xylene, toluene and benzene.

The inventors have found that the liquefied gas(es) and/or supercritical fluids (component (c)) are excellent diluents for the oligomers and polymers involved in the process in accordance with the present invention and may be present in an amount of at least 15 parts by weight of the oligomers (a). Preferably there is provided from 15 to about 500 parts by weight of component (c) per 100 parts of component (a). Most preferably there is provided 15 to 250 parts by weight of component (c) per 100 parts of (a). There can't be any less of component (c) present as less than 15 parts results in the polycondensation product, in practical terms, having a restricted potential chain length prepared due to the highly viscous nature of the product because of the lack of diluent. Whilst there is no absolute upper limit for the amount of component (c) as the amount increases compared to that of component (a) the oligomers can be overly diluted to the extent that the oligomers(component (a)) become too diluted to the extent that the dilution negatively effects the reaction rate of polymerisation.

Preferably the product resulting from the polymerisation process in accordance with the present invention described comprises a polysiloxane based polymer containing at least two hydroxyl or hydrolysable groups, most preferably the polymer comprises terminal hydroxyl or hydrolysable groups. Preferably the polymer has the general formula $$X\text{-}A\text{-}X^1 \qquad (2)$$

where X and $X^1$ are independently selected from siloxane groups which terminate in hydroxyl or hydrolysable groups and A is a polymeric chain.

Examples of hydroxyl-terminating or hydrolysable groups X or $X^1$ include —$Si(OH)_3$, —$(R^a)Si(OH)_2$, —$(R^a)_2SiOH$, —R$^a$Si(OR$^b$)$_2$, —Si(OR$^b$)$_3$, —R$^a_2$SiOR$^b$ or —R$^a_2$Si—R$^c$—SiR$^d_p$(OR$^b$)$_{3-p}$ where each R$^a$ independently represents a monovalent hydrocarbyl group, for example, an alkyl group, in particular having from 1 to 8 carbon atoms, (and is preferably methyl); each R$^b$ and R$^d$ group is independently an alkyl or alkoxy group in which the alkyl groups suitably have up to 6 carbon atoms; R$^c$ is a divalent hydrocarbon group which may be interrupted by one or more siloxane spacers having up to six silicon atoms; and p has the value 0, 1 or 2. Preferably X and/or X$^1$ contain hydroxyl groups or groups which are otherwise hydrolysable in the presence of moisture.

Examples of suitable siloxane groups which may be present in A in formula (2) are those which comprise a polydiorgano-siloxane chain. Thus group A preferably includes siloxane units of formula (3)

$$—(R^5_s SiO_{(4-s)/2})— \quad (3)$$

in which each R$^5$ is independently an organic group such as a hydrocarbyl group having from 1 to 10 carbon atoms optionally substituted with one or more halogen group such as chlorine or fluorine and s is 0, 1 or 2, but is typically 2 for all non-terminal groups. Particular examples of groups R$^5$ include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Suitably, at least some and preferably substantially all of the groups R$^5$ are methyl.

Group A in the compound of formula (2) may include any suitable siloxane or siloxane/organic molecular chain providing the resulting polymer a viscosity (in the absence of component (c) in accordance with the present invention of up to 20 000 000 mPa·s, at 25° C. (i.e. up to or even more than 200 000 units of formula (3)). In one preferred embodiment A is a linear organopolysiloxane molecular chain, i.e. s has an average value of between 1.8 and 2.2 for substantially all chain units. Preferred materials have polydiorganosiloxane chains according to the general formula (4)

$$—(R^5_2 SiO)_t— \quad (4)$$

in which each R$^5$ is as defined above and is preferably a methyl group and t has a value of up to 200 000. Suitable polymers have viscosities of up to or more than 20 000 000 mPa·s at 25° C. in the absence of the component (c) in the process in accordance with the present invention but when prepared in the presence of component (c) viscosities are generally in the order of 1000 to 100 000 mPa·s at 25° C. because of the presence of component (c). However, it will be appreciated that the viscosity will significantly increase once the pressure in the reaction vessel is released, causing the removal of component (c) from the polymer matrix of the product.

Preferred polysiloxanes containing units of formula (4) are thus polydiorganosiloxanes having terminal, silicon-bound hydroxyl groups or terminal, silicon-bound organic radicals which can be hydrolysed using moisture as defined above. The polydiorganosiloxanes may be homopolymers or copolymers. Mixtures of different polydiorganosiloxanes having terminal condensable groups are also suitable.

In accordance with the present invention component A may alternatively comprise random or block copolymer a block copolymeric backbone comprising siloxane groups of the type depicted in formula (2) above and an organic component as hereinbefore described with respect to the starting materials discussed above. The most preferred organic based polymeric blocks in A are polyoxyalkylene based blocks of the types previously described. Backbone A may alternatively comprise solely the polyoxyalkylene blocks as hereinbefore described terminated by groups X and X$^1$ discussed above.

One of the most important aspects of the present invention is the fact that by polymerising the polymer in the presence of component (c) the starting materials and resulting polymeric product mixtures produced during the reaction process have a significantly lower viscosity than would normally be expected. This is because, whilst in the form of a liquid or supercritical fluid, component (c) effectively dilutes the mixture. This dilution during polymerisation enables polymerisation of polymers of significantly greater chain length/molecular weight than could have previously been practically used.

This is because the viscosity of such polymers, in the absence of component (c), would be too high to enable the sufficiently thorough blending of the other ingredients of a composition with the polymer because the polymer would be in the form of an ultra-high viscosity gum. Hence in a further embodiment of the present invention the process may include a process whereby the polymer is initially prepared in accordance with the present invention and then one or more ingredients of a composition to be prepared in combination with the resulting polymer are introduced into the diluted polymer prior to removal of component (c) in order to increase the efficiency of mixing of said ingredients. Such a mixing step taking place prior to the removal of the gas maintains the polymer at a comparatively low viscosity (as opposed to when component (c) is absent). Subsequent to adding one or more of the other ingredients of said composition component (c) can be removed by e.g. pressure release.

Such additional process steps avoid the need for expensive and time consuming blending processes typically used in the industry for introducing e.g. fillers, surfactants (in the case of making emulsions) etc. in the final composition.

Preferably the diluted polymer of the present invention comprises a polymer component which in accordance with the present invention is a silicon containing polymer having a number average molecular weight (M$_w$) of at least 100000 g/mol as determined following ASTM D5296-05 and calculated as polystyrene molecular weight equivalents.

The polymerisation process in accordance with the invention may be carried out either batchwise or continuously using any suitable mixers. Where the polycondensation by-product is water, the water may be removed by chemical drying using e.g. hydrolysable silanes like methyltrimethoxysilane (which could additionally function as polymer end-blockers) or zeolites or the like or by physical separation by "freezing out" the water or by using evaporation, coalescing or centrifuging techniques. The polycondensation reaction in accordance with the present invention may be carried out at any appropriate temperature. Preferably the process in accordance with the present information takes place at a temperature of between room temperature (about 20 to 25° C.) to about 80° C. but may, if required, be undertaken at temperatures outside this range in appropriate circumstances e.g. below 0° C. in cases where it is intended to freeze out the condensation reaction by-product, typically water).

Any suitable method for making the polymer in accordance with the method of the present invention may be used. One suitable method comprises introducing the oligomer(s) (component (a)) into a reaction vessel prior to/simultaneously with or subsequent to component (c) applying the appropriate pressure to liquefy component (c) or to make it a supercritical fluid, homogenising the mixture, adding the catalyst (component (b)) rehomodgenising the mixture and then polymerising the mixture. Preferably the oligomers are added subsequent to the formation of the liquefied gas/supercritical fluid. Once the polymerisation is completed (e.g. when the mixture has reached a predetermined viscosity) the pressure may be released and component (c)) may be removed.

The resulting polymer made in accordance with any method of the invention may be emulsified in the presence of the diluent following a similar process to those described in WO 2008 045427. In such a process the diluent is removed only after the emulsification step. This has the advantage of providing a silicone emulsion containing very low amounts of cyclics volatile siloxane impurities.

The resulting polymers made in accordance with the process of the present invention are useful in the preparation of e.g. non-shrinking low modulus sealants, personal care product or pressure sensitive adhesives which require both:
1) undiluted polymers (i.e. unplasticised and/or lacking an extender(s))
2) polymers of high purity.

The present invention will now be exemplified in the accompanying examples.

EXAMPLES

All pressures indicated were determined using an analogous pressure gage (Heise CM 13961, Newtown, Conn. 5000 bar ($5000 \times 10^5$ Pa) maximum pressure). Viscosity values of polydimethylsiloxane starting materials measured by means of a Brookfield LV DV-E viscosimeter Examples 1 a-f A series of polydimethylsiloxane polymers were prepared by polymerizing a mixture of dimethyl hydroxyl terminated polydimethylsiloxane (oligomeric siloxanes) having a viscosity of 70 mPa·s at 25° C. and carbon dioxide ($CO_2$ supplied by Westfalen AG, Germany) using DBSA (dodecylbenzensulfonic acid) as a catalyst. The polymers were prepared at a series of different pressures The polymerisation reactions were carried out at room temperature (about 23° C.) or 40° C. in a hermetic rheometer cell consisting of concentric cylinders to which external pressure was applied, when required, by means of a screw press. The reaction mixture was prepared by introducing the $CO_2$ in to the oligomeric siloxane in a pressure cell and homogenising them at a desired pressure by means of shaking a stainless steel ball which was placed in the cell. Then the catalyst was added under pressure and the mixture was rehomogenized and then transferred under pressure to a viscosity measuring cell. The measuring cell comprised a closed chamber. A rotating inner cylinder contains 4 magnets in addition to a measuring head which is connected to a commercial rheometric drive (M5, Thermo-Haake, Karlsruhe Germany). The rheometer was calibrated with a silicone of know viscosity. The viscosities of the mixture were measured versus time at a constant shear rate of 5 s$^{-1}$. The pressure was released and the polymerisation was stopped, by the addition of an excess of TEA (triethanolamine), once a viscosity of approximately 50000 mPa·s, at the temperature indicated in Table 1A, was reached.

TABLE 1A summarises the experimental conditions

| Example | Pressure ($\times 10^5$ Pa) | T (° C.) | Siloxane (g) | $CO_2$ (g) | DBSA (g) | Reaction time (min) |
|---|---|---|---|---|---|---|
| 1 a | 80 | 23 | 60 | 53 | 2.4 | 32 |
| 1 b | 150 | 23 | 64 | 54 | 2.4 | 31 |

TABLE 1A-continued summarises the experimental conditions

| Example | Pressure ($\times 10^5$ Pa) | T (° C.) | Siloxane (g) | $CO_2$ (g) | DBSA (g) | Reaction time (min) |
|---|---|---|---|---|---|---|
| 1 c | 300 | 23 | 58 | 55 | 2.4 | 33 |
| 1 d | 300 | 40 | 59 | 35 | 1.5 | 88 |

The resulting polymer/extender blends were analysed by means of gel permeation chromatography (GPC) and Gas Chromatography (GC) for their molecular weight and cyclic siloxane content. Molecular weights and polydispersities (Mw/Mn) were determined by GPC following ASTM D5296-05 using toluene as solvent. The molecular weights were calculated as polystyrene molecular weight equivalents. Cyclic siloxane contents were measured using GC-FID (flame ionisation detection). An Agilent 6890 GC with autosampler and FID detection was used. The separation was made with a J&W DB-1 30 m*0.32 mm/0.25 μm column. Analysis was completed with a 1 μl injection into a split-splitless injector (split 10/1). Detector operation was at a temp of 260° C. Oven parameters were 50° C. for 2 min then ramped at 15 degrees per minute to 250° C., and then left at 250° C. for 10 min.

TABLE 1B

| Example | Mw (kg/mol) | Mw/Mn | $D_4$ | $D_5$ | $D_6$ |
|---|---|---|---|---|---|
| 1 a | 193 | 2.83 | 0.242 | 0.124 | 0.121 |
| 1 b | 97 | 2.60 | 0.201 | 0.096 | 0.109 |
| 1 c | 126 | 2.58 | 0.132 | 0.067 | 0.099 |
| 1 d | 170 | 2.36 | 0.237 | 0.087 | 0.120 |

Example 2

A series of polydimethylsiloxane polymers were prepared using the same equipment and process as described in example 1 by polymerizing a mixture of dimethyl hydroxyl terminated polydimethylsiloxane (oligomeric siloxanes) having a viscosity of 70 mPa·s at 25° C. and propane (Valentine Gas Mainz, Germany) using DBSA as the catalyst. The polymers were prepared at a series of different pressures. The polymerisation was carried out at room temperature (about 23° C.) in the hermetic rheometer cell. The reaction mixture was prepared by introducing the propane in to the oligomeric siloxane in a pressure cell and homogenising them under the desired pressure as previously described. Then the catalyst was added under pressure and the mixture was homogenized and then transferred under pressure to the viscosity measuring cell as hereinbefore described. The rheometer was again calibrated with a silicone of know viscosity. The viscosities of the mixture were measured versus time at a constant shear rate of 5 s$^{-1}$. The pressure was released and the polymerisation was stopped, by the addition of an excess of TEA (triethanolamine).

TABLE 2a summarises the experimental conditions

| Example | Pressure ($\times 10^5$ Pa) | T (° C.) | Siloxane (g) | $CO_2$ (g) | DBSA (g) | Reaction time (min) |
|---|---|---|---|---|---|---|
| 2 a | 80 | 23 | 61 | 25 | 4.8 | 360 |
| 2 b | 150 | 23 | 59 | 28 | 3.7 | 256 |
| 2 c | 300 | 23 | 62 | 21 | 1.6 | 49 |
| 2d | 80 | 23 | 58 | 21 | 1.7 | 277 |

TABLE 2a-continued summarises the experimental conditions

| Example | Pressure ($\times 10^5$ Pa) | T (° C.) | Siloxane (g) | $CO_2$ (g) | DBSA (g) | Reaction time (min) |
|---|---|---|---|---|---|---|
| 2e | 150 | 23 | 63 | 18 | 1.4 | 305 |
| 2f | 500 | 23 | 68 | 19 | 1.5 | 88 |
| 2g | 300 | 23 | 67 | 21 | 1.6 | 310 |

The resulting polymer/extender blends were analysed by means of gel permeation chromatography (GPC) and Gas Chromatography (GC) for their molecular weight and cyclic siloxane content. Molecular weights and polydispersities (Mw/Mn) were determined by GPC following ASTM D5296-05 using toluene as solvent. The molecular weights were calculated as polystyrene molecular weight equivalents. Cyclic siloxane contents were measured using GC-FID (flame ionisation detection) as discussed above.

TABLE 2b

| Example | Mw (kg/mol) | Mw/Mn | $D_4$ | $D_5$ | $D_6$ |
|---|---|---|---|---|---|
| 2 a | 471 | 2.70 | 0.128 | 0.079 | 0.121 |
| 2 b | 62 | 2.63 | 0.044 | 0.033 | 0.079 |
| 2 c | 440 | 2.51 | 0.115 | 0.060 | 0.105 |
| 2 d | 212 | 2.91 | 0.080 | 0.054 | 0.100 |
| 2 e | 104 | 2.67 | 0.051 | 0.032 | 0.080 |
| 2 f | 70 | 2.55 | 0.031 | 0.028 | 0.078 |
| 2 g | 185 | 2.68 | 0.096 | 0.050 | 0.084 |

Hence via this method it can be seen that siloxane polymers having less than 0.1% by weight of the final product of one or more of $D_4$, $D_5$ and/or $D_6$ can be prepared. Furthermore in some cases the cumulative total of $D_4$, $D_5$ and/or D6 is less than 0.1% by weight of the final product

The invention claimed is:

1. A method of making a polysiloxane containing polymer comprising the steps of:
   polycondensation of
   (a) 100 parts by weight of oligomers comprising non-cyclic siloxane containing oligomers having at least two condensable groups per molecule alone or in a mixture with one or more organic oligomers having at least two condensable groups per molecule in the presence of:
   (b) at least 2 parts by weight per 100 parts of (a) of one or more condensation catalysts comprising a Bronsted acid or a Lewis acid; and
   (c) at least 15 parts by weight per 100 parts of (a) of one or more liquefied gases or a supercritical fluid therefrom; and
   subsequently recovering the polysiloxane containing polymer by expansion of the liquefied gas(es) or supercritical fluid.

2. A method in accordance with claim 1 wherein the polymerization product has the general formula $X$-$A$-$X^1$ where A is a siloxane containing polymeric chain and X and $X^1$ are independently selected from siloxane groups which terminate in hydroxyl or hydrolysable groups selected from —Si(OH)$_3$, —(R$^a$)Si(OH)$_2$, —(R$^a$)$_2$SiOH, —R$^a$Si(OR$^b$)$_2$, —Si(OR$^b$)$_3$, —R$^a{}_2$SiOR$^b$ or —R$^a{}_2$Si—R$^c$—SiR$^d{}_p$(OR$^b$)$_{3-p}$ where each R$^a$ independently represents a monovalent hydrocarbyl group having from 1 to 8 carbon atoms; each R$^b$ and R$^d$ group is independently an alkyl or alkoxy group in which the alkyl groups have up to 6 carbon atoms; R$^c$ is a divalent hydrocarbon group optionally interrupted by one or more siloxane spacers having up to six silicon atoms; and p has the value 0, 1 or 2.

3. A method in accordance with claim 1 wherein the polymerization process is a polycondensation polymerization process in which a linear and/or branched organopolysiloxane having hydrolysable terminal groups is polymerized in the presence of dodecylbenzenesulphonic acid as the condensation catalyst.

4. A method in accordance with claim 3 in which the polycondensation reaction is quenched by a mono/di and trialkanolamine or an aluminasilicate zeolite.

5. A method in accordance with claim 1 wherein the/or each liquefied gas(es) or supercritical fluid is selected from one or more of carbon dioxide, helium, argon, xenon, nitrogen, nitrogen oxides, alkylhalides, chlorotrifluoromethane, carbon tetrachloride, chloroform, methylenechloride, xylene, toluene, benzene, and/or hydrocarbon gases.

6. A method in accordance with claim 1 wherein the/or each liquefied gas(es) or supercritical fluid is provided in a total range of 15 to 250 parts by weight.

7. A method in accordance with claim 1 wherein the one or more liquefied gases or the supercritical fluid is at least substantially miscible with monomer/oligomer and the polymer.

8. A method in accordance with claim 1 wherein the process takes place at a pressure of $150 \times 10^5$ Pa or more.

9. A method in accordance with claim 1 wherein subsequent to polymerization, the method comprises: emulsifying the polymerization product, and removing the one or more liquefied gases or the supercritical fluid only after the emulsification step.

10. A method in accordance with claim 1 characterised in that less than 0.5% by weight of the final product is volatile cyclic siloxane impurities.

11. A method in accordance with claim 2 wherein the polymerization process is a polycondensation polymerization process in which a linear and/or branched organopolysiloxane having hydrolysable terminal groups is polymerized in the presence of dodecylbenzenesulphonic acid as the condensation catalyst.

12. A method in accordance with claim 11 in which the polycondensation reaction is quenched by a mono/di and trialkanolamine or an aluminasilicate zeolite.

* * * * *